June 17, 1947.　　　　C. LORBER　　　　2,422,491
SELF-QUIZ DEVICE
Filed July 2, 1945　　　2 Sheets—Sheet 1

Fig. 1

| | WRITE "F" FOR FALSE OR "T" FOR TRUE | WRITE HERE |
|---|---|---|
| 1 | HOOP JR. ROLLS TO 5 LENGTH DERBY VICTORY. | |
| 2 | 200 000 GERMANS TO LABOR FOR U.S. | |
| 3 | TOTALITARIAN RULE IN REICH IS PREDICTED. | |

TEAR ON THIS LINE AND FOLD TO LEFT

USUAL PRINTED MATTER

| 9 | ONLY 8% OF FRENCH CAPTIVES DIED. | |
|---|---|---|
| 10 | CIVILIANS TO GET MORE MEAT IN FALL. | |

Fig. 2

| | WRITE "F" FOR FALSE OR "T" FOR TRUE | | | | PAGE | COLUMN |
|---|---|---|---|---|---|---|
| 1 | HOOP JR. ROLLS TO 5 LENGTH DERBY. | | 1 | FALSE | 1 | 1 |
| 2 | 200 000 GERMANS TO LABOR FOR U.S. | | 2 | FALSE | 2 | 1 |
| 3 | TOTALITARIAN RULE IN REICH IS PREDICTED. | | 3 | TRUE | 2 | 2 |
| 9 | ONLY 8% OF FRENCH CAPTIVES DIED.. | | 9 | TRUE | 12 | 1 |
| 10 | CIVILIANS TO GET MORE MEAT IN FALL. | | 10 | TRUE | 3 | 6 |

Inventor
Charles Lorber,
By　Attorney

June 17, 1947.                    C. LORBER                        2,422,491
                               SELF-QUIZ DEVICE
                             Filed July 2, 1945            2 Sheets—Sheet 2
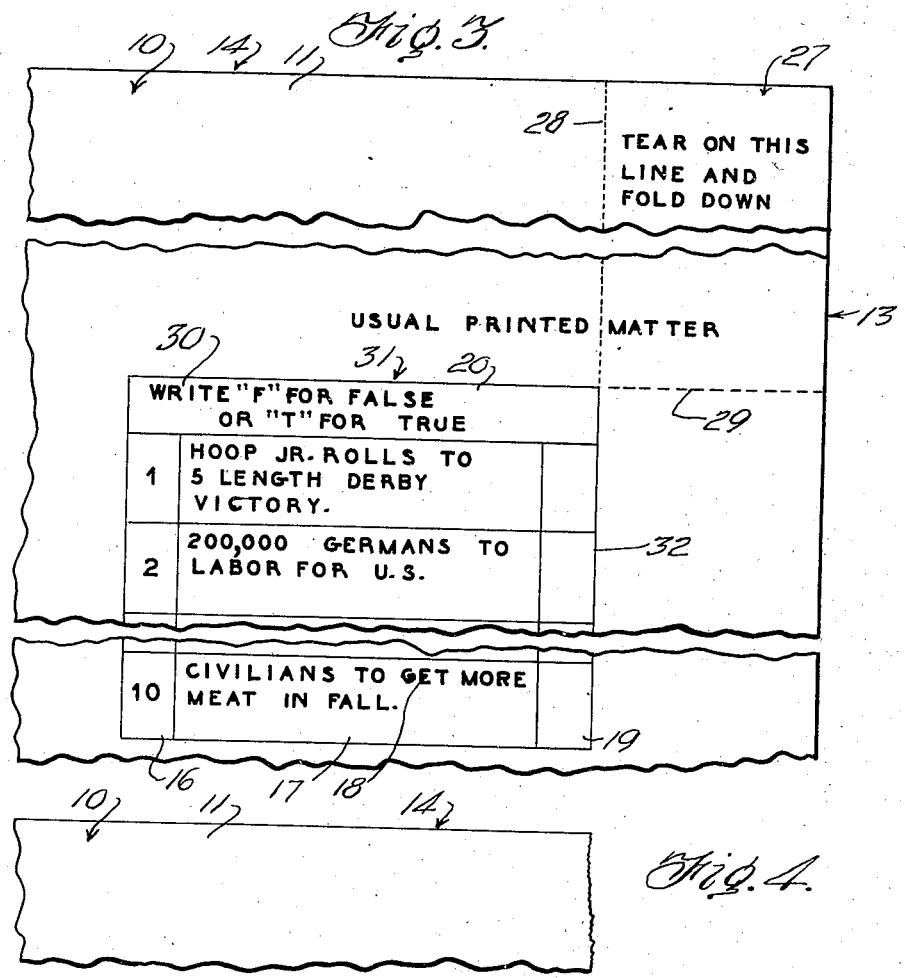
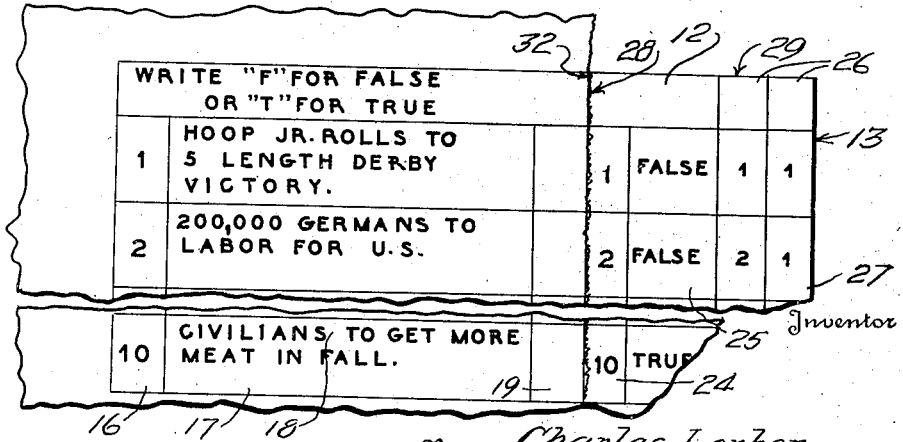

Patented June 17, 1947

2,422,491

UNITED STATES PATENT OFFICE 2,422,491

SELF-QUIZ DEVICE

Charles Lorber, Louisville, Ky.

Application July 2, 1945, Serial No. 602,853

7 Claims. (Cl. 35—48)

This invention relates to knowledge testing devices and especially to a knowledge testing device for use in periodicals.

One important object of the invention is to provide a device for the purpose set forth which is adapted for use in connection with newspapers, magazines and other periodicals.

The second important object of the invention is to provide a device of this character wherein the user may readily ascertain whether or not he has given correct answers to certain problems submitted.

A third important object of the invention is to provide a device of this character wherein certain problems are set forth on one side of a sheet of a periodical and the answers set forth on the opposite side, the sheet being so constructed that the answers may be folded into juxtaposition with the problem.

Moreover the invention has for an object the training of the user's observation and memory.

With the above and other objects in view the invention consists in general of certain novel features of construction hereinafter fully described, illustrated in the accompanying drawings, and particularly claimed.

In the accompanying drawings like characters of reference indicate like parts in the several views, and Fig. 1 is a fragmentary broken view showing the face side of a periodical sheet and disclosing the invention.

Fig. 2 is a view similar to Fig. 1 with a portion of the sheet folded in accordance with this invention.

Fig. 3 is a view similar to Fig. 1 but showing a modification of the invention.

Fig. 4 is a view of the modification similar to Fig. 2.

In each form of the invention as here shown there is disclosed a portion of a periodical sheet indicated in general at 10. The obverse or face side of the sheet is shown at 11 and the reverse or back side of a portion of the sheet being shown at 12.

Also as here shown the sheet has a side edge 13 and a horizontal edge 14. The horizontal edge in Figs. 1 and 2 being shown at the bottom and in Figs. 3 and 4 at the top of the sheet.

In the form shown in Figs. 1 and 2 there is illustrated a rectangular printed portion 15 wherein there is disclosed a vertical column of numbered spaces 16 opposite each of which is a space 17 containing a problem 18. Also opposite each of the problems is a blank space 19 for the insertion of the putative answer to the particular problem. This rectangular space 15 has a heading 20 giving directions for the use of the device so far as answering the problem is concerned. At 21 is a rectangular sheet portion defined on the edge opposite the horizontal edge 14 by weakened or tear line 22 and a fold line 23, the latter being spaced one-half the distance between the right hand edge of the rectangular portion 15 and the right hand edge 13. This arrangement is such that by tearing along the tear line 22 and folding on the line 23 to the left the edge 13 is brought into juxtaposition with the right hand edge of the rectangle 15 as shown in Fig. 2. Fig. 2 shows that this rectangular portion 21 is provided with a number column 24, a column of answers 25 and additional information columns 26. In the present instance the problems have been shown as the headings to articles in a newspaper and the answers to be placed in the answer column 19 relate first of all as to whether these headings are correctly quoted. Or that the information conveyed by the headings is correctly quoted. Secondly, the spaces in the column 19 may also be utilized to indicate the page and column of the newspaper where the particular article is to be found.

While the problems set forth for answer are limited here to newspaper work it is to be understood that these problems may give the headings of magazine articles, may relate to matters of general information or may be of mathematical or any other character desired. In any event the answers will, under this construction of the periodical page, show directly opposite and in alinement to the problems given.

In the form of the invention shown in Figs. 3 and 4 rectangular portion 21 is replaced by the rectangular portion 27 defined by a tear line 28 parallel to the edge 13 and a fold line 29 parallel to the edge 14. Here there is also provided a rectangular space 30 similar in all respects to a rectangular space 15 but the space 30 has an upper edge 31 alined with the fold 29 and the right hand edge 32 alined with the tear line 28. The space 30 has the arrangement of columns and spaces identical with the space 15 and the rectangular portion 27 has on the reverse side an arrangement identical with the arrangement of the rectangular portion 22.

In the use of this form of the invention after the spaces 19 have had the putative answers inserted the rectangular portion 27 is torn down line 28 and folded on the line 29 so as to bring the answers in the columns 25 and 26 opposite the respective problems.

What is claimed, is:

1. A periodical sheet having a obverse and a reverse side, the obverse side of said sheet bearing a portion including a columnar series of problems spaced from an edge of the sheet, the sheet bearing at an edge a rectangular portion defined from the remainder of the sheet by a tear line perpendicular to said edge and a fold line parallel to the edge, said portion having one edge coinciding with an edge of the first portion, when torn on the tear line and folded on the fold line, said rectangular portion having on the reverse side a column of answers to said problems said tear lines and fold lines being so positioned and arranged that upon tearing on the tear line and folding on the fold line the problem and answer portions of the sheet will be juxtaposed and the series of problems and answers in alignment for comparison.

2. A periodical sheet having obverse and reverse sides, said sheet having a side edge and a horizontal edge, a rectangular portion on the obverse side defined from at least one of said edges by boundary lines of which one is parallel to and spaced from said side edge, said rectangular portion bearing a columnar series of problems and a columnar series of spaces for the insertion of answers to said problem with the latter nearer said side edge, said sheet having a second rectangular portion having one edge defined by a tear line alined with an edge of the first space and a fold line at right angles to said tear line, said second portion bearing on the reverse side answers to said problems said tear lines and fold lines being so positioned and arranged that upon tearing on the tear line and folding on the fold line the problem and answer portions of the sheet will be juxtaposed and the series of problems and answers in alignment for comparison.

3. A periodical sheet having obverse and reverse sides, said sheet having a side edge and a horizontal edge, a rectangular portion on the obverse side defined from at least one of said edges by boundary lines of which one is parallel to and spaced from said side edge, said rectangular portion bearing a columnar series of problems and a columnar series of spaces for the insertion of answers to said problem with the latter nearer said side edge, said sheet having a second rectangular portion having one edge defined by a tear line alined with an edge of the first space and a fold line at right angles to said tear line, said second portion bearing on the reverse side answers to said problems, said fold line being equidistant from the side edge of the sheet and the adjacent edge of the first rectangular portion said tear lines and fold lines being so positioned and arranged that upon tearing on the tear line and folding on the fold line the problem and answer portions of the sheet will be juxtaposed and the series of problems and answers in alignment for comparison.

4. A periodical sheet having obverse and reverse sides, said sheet having a side edge and a horizontal edge, a rectangular portion on the obverse side defined from at least one of said edges by boundary lines of which one is parallel to and spaced from said side edge, said rectangular portion bearing a columnar series of problems and a columnar series of spaces for the insertion of answers to said problem with the latter nearer said side edge, said sheet having a rectangular portion having one edge defined by a tear line alined with an edge of the first space and a fold line at right angles to said tear line, said second portion bearing on the reverse side answers to said problems, said fold line beng alined with a horizontal edge of said first rectangular portion said tear lines and fold lines being so positioned and arranged that upon tearing on the tear line and folding on the fold line the problem and answer portions of the sheet will be juxtaposed and the series of problems and answers in alignment for comparison.

5. A periodical sheet having obverse and reverse sides, said sheet having a side edge and a horizontal edge, a rectangular portion on the obverse side defined from at least one of said edges by boundary lines of which one is parallel to and spaced from said side edge, said rectangular portion bearing a columnar series of problems and a columnar series of spaces for the insertion of answers to said problem with the latter nearer said side edge, said sheet having a second rectangular portion having one edge defined by a tear line alined with an edge of the first space and a fold line at right angles to said tear line, said second portion bearing on the reverse side answers to said problems, said second rectangular portion being located at one corner of said sheet said tear lines and fold lines being so positioned and arranged that upon tearing on the tear line and folding on the fold line the problem and answer portions of the sheet will be juxtaposed and the series of problems and answers in alignment for comparison.

6. A periodical sheet having obverse and reverse sides, said sheet having a side edge and a horizontal edge, a rectangular portion on the obverse side defined from at least one of said edges by boundary lines of which one is parallel to and spaced from said side edge, said rectangular portion bearing a columnar series of problems and a columnar series of spaces for the insertion of answers to said problem with the latter nearer said side edge, said sheet having a second rectangular portion having one edge defined by a tear line alined with an edge of the first space and a fold line at right angles to said tear line, said second portion bearing on the reverse side answers to said problems, said fold line being equidistant from the side edge of the sheet and the adjacent edge of the first rectangular portion said tear lines and fold lines being so positioned and arranged that upon tearing on the tear line and folding on the fold line the problem and answer portions of the sheet will be juxtaposed and the series of problems and answers in alignment for comparison.

7. A periodical sheet having obverse and reverse sides, said sheet having a side edge and a horizontal edge, a rectangular portion on the obverse side defined from at least one of said edges by boundary lines of which one is parallel to and spaced from said side edge, said rectangular portion bearing a columnar series of problems and a columnar series of spaces for the insertion of answers to said problem with the latter nearer said side edge, said sheet having a second rectangular portion having one edge defined by a tear line alined with an edge of the first space and a fold line at right angles to said tear line, said second portion bearing on the reverse side answers to said problems, said second rectangular portion being located at one corner of said sheet, said fold line being alined with a horizontal edge of said first rectangular portion said tear lines and fold lines being so positioned and arranged that upon tearing on the tear line and folding on the fold line the problem and answer portions of the sheet will be juxtaposed and the series of problems and answers in alignment for comparison.

CHARLES LORBER.

REFERENCES CITED

The following references are of record in the file of this patent:

UNITED STATES PATENTS

| Number | Name | Date |
| --- | --- | --- |
| 1,520,755 | Kelly | Dec. 30, 1924 |
| 1,702,026 | Austin | Feb. 12, 1929 |
| 1,982,611 | Harnett | Nov. 27, 1934 |
| 2,305,972 | Lorber | Dec. 22, 1942 |